Figure 1:
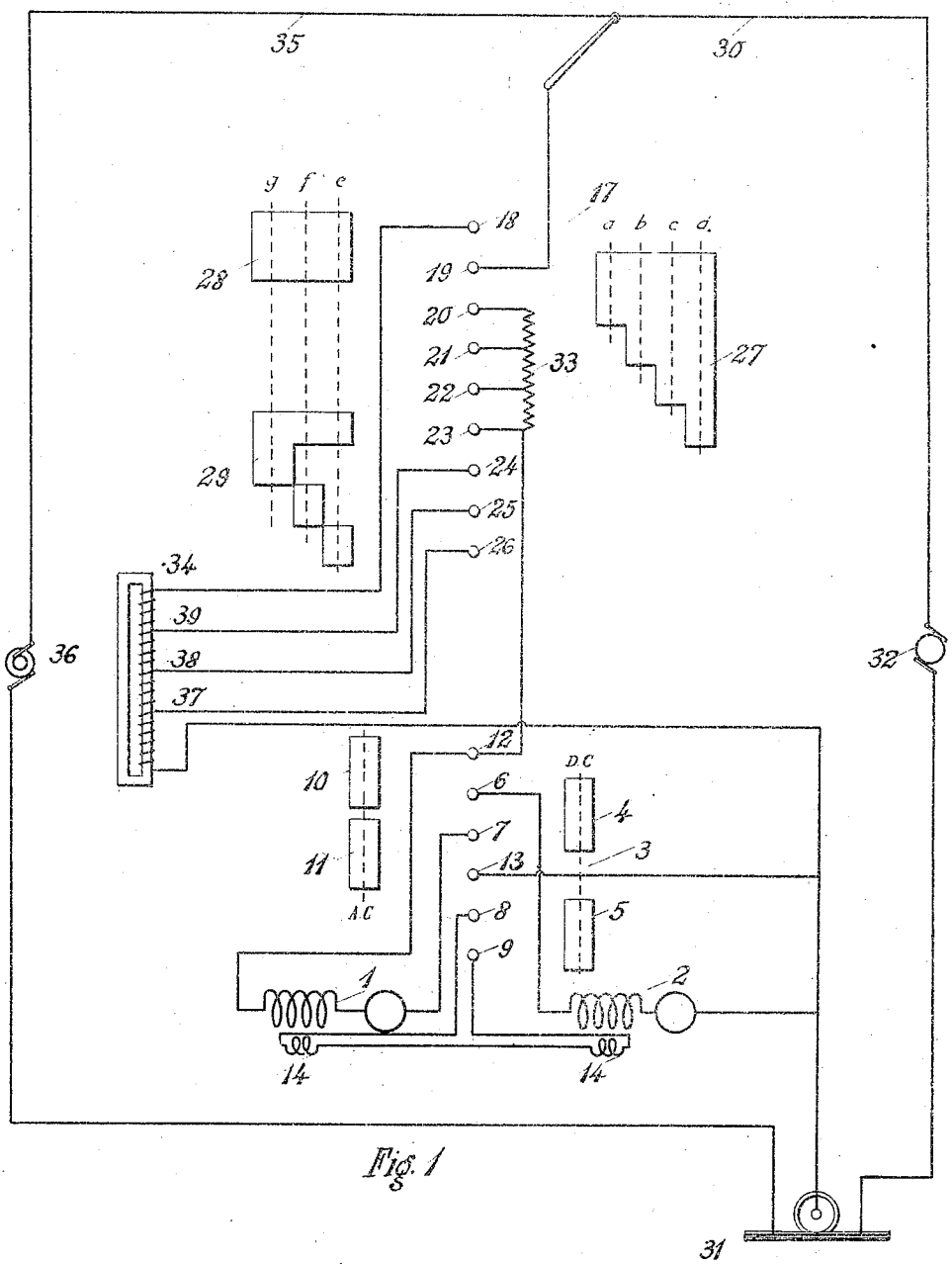

B. G. LAMME.
SYSTEM OF CONTROL FOR ELECTRIC MOTORS.
APPLICATION FILED DEC. 4, 1905.

900,289.

Patented Oct. 6, 1908.

3 SHEETS—SHEET 1.

WITNESSES:
Camille Boulin
Otto S. Schairer

INVENTOR
Benjamin G. Lamme
BY
Wesley G. Carr
ATTORNEY

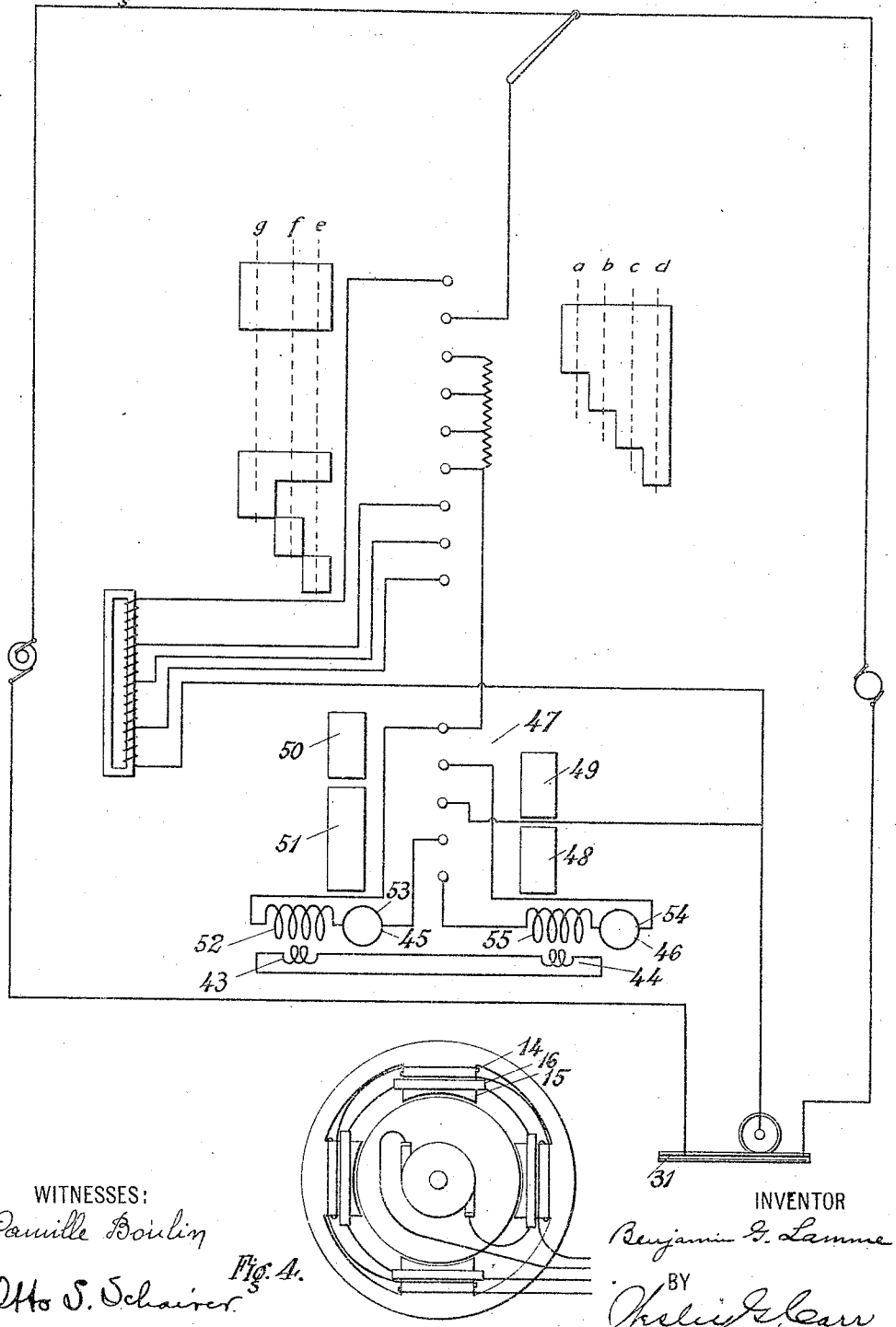

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL FOR ELECTRIC MOTORS.

No. 900,289.    Specification of Letters Patent.    Patented Oct. 6, 1908.

Application filed December 4, 1905. Serial No. 290,122.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Systems of Control for Electric Motors, of which the following is a specification.

My invention relates to electric motors that are adapted to be operated by either direct or alternating currents, and to systems of control therefor.

The object of my invention is to provide improved means whereby the occurrence of excessive induced voltages in the motor circuits, upon interruption thereof, may be effectually prevented.

It is well known to those skilled in the art that, upon the interruption of the circuit of an electric motor, a very high induced voltage often exists momentarily in the circuit as a result of the sudden reduction in the magnetism of the field, and oftentimes this is sufficient to cause a disruptive discharge through the insulation, after which serious injury may occur to the motor when it is again connected to the supply circuit. The induced voltage is directly proportional to the rapidity with which the circuit is interrupted, the total change in the magnetic flux and the total number of turns through which this flux changes. If one or more closed circuit conducting paths surround the magnetic circuit, the difference of potential will be reduced, because such paths serve as secondary circuits and retard the rate of change of the magnetic flux. In motors of ordinary construction, the above mentioned closed circuits may be provided by the solid material of the field magnet poles or yoke or by the devices which secure the field magnet windings upon the polar projections, or they may be provided by the armature coil or coils, the terminals of which are connected together at the instant of commutation. The effectiveness of this latter path as a secondary circuit for retarding the rate of change of the flux usually depends upon the resistance of the brushes and the character and extent of the contact which they make with the commutator cylinder.

In motors of the commutator type that are adapted to be operated by alternating currents, low resistance closed circuit paths are avoided as far as possible, because the entire magnetic flux changes at a very rapid rate. While these motors are usually provided with field magnet windings having only a very few turns, in order that the ratio of field ampere turns to armature ampere turns may be low, and while they are so designed in other respects as to have but relatively low total induction, still the momentary rise in the voltage upon suddenly interrupting the circuits may amount to two or more times the normal voltage.

The rise in voltage upon interrupting the circuit of a single motor may not cause injury thereto, but if the motors are connected in series and the circuit is interrupted only at the terminals of the series, the rise in voltage may be excessive and cause a disruptive discharge to occur through the insulation of the circuit. The alternating voltage upon which these motors are adapted to operate best is low as compared with that which usually occurs upon the distributing circuit. When the motors are operated by alternating currents, they are usually connected in parallel and the high voltage of the distributing circuit is changed to the low voltage required by the motors by means of transformers; but when they are operated by direct currents, they are generally connected in series to receive the full voltage of the distributing circuit, because of the impracticability of reducing such voltage. It follows, therefore, as hereinbefore stated, that under these conditions it is very desirable to employ some means for reducing the voltage which is induced upon interruption of the circuit.

According to my invention, the motors are provided with auxiliary field magnet windings which remain open-circuited when the motors are operated by alternating currents, but which are closed-circuited when the motors are operated by direct currents or when they are disconnected from the direct current supply circuit. The auxiliary field magnet windings may also be connected in pairs in closed circuit and the means for adjusting the motor circuits may be so arranged that the induced electromotive forces in the respective auxiliary field magnet windings of each pair may be caused to traverse the closed circuit in the same direction when the motors are operated by direct currents and in opposite directions when they are operated by alternating currents. With this arrangement, the auxiliary windings become effective as a means for retarding the rate of change of the magnetic flux when the motors are operated in series by direct currents, but have no effect when the motors are operated in parallel by alternating currents.

Figure 2:
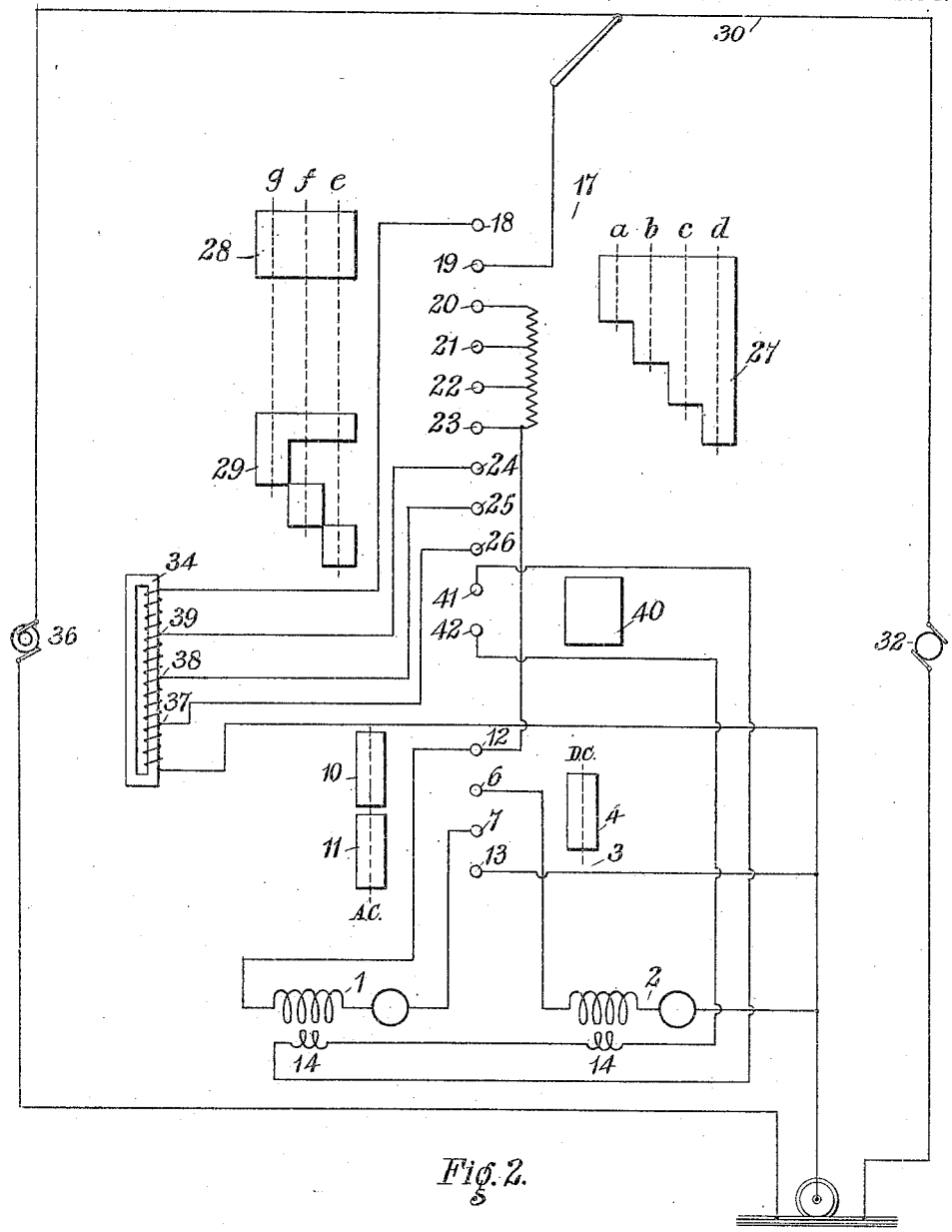

Figure 1 of the accompanying drawings illustrates, diagrammatically, a system of control embodying my invention. Fig. 2 is a diagram of a modification of the system shown in Fig. 1. Fig. 3 is a diagram of a further modification of the invention shown in Fig. 1, and Fig. 4 is a view, in end elevation, of a motor constructed in accordance with my invention.

The circuit relations of a pair of motors 1 and 2 may be adjusted by means of a change-over switch 3, the conducting segments 4 and 5 of which engage contact terminals 6, 7, 8 and 9 when the motors are operated by direct currents and the conducting segments 10 and 11 of which engage contact terminals 12, 6, 7 and 13 when the motors are operated by alternating currents, the motors being connected in series relation in the former case and in parallel relation in the latter. The motors 1 and 2 are provided with auxiliary windings 14 that are preferably placed upon the field magnet polar projections 15 beside the main exciting coils 16, as indicated in Fig. 4. The terminals of the windings 14 are connected, respectively, to contact fingers 8 and 9 that are engaged by conducting segment 5 when the motors are connected in series relation for operation by direct currents. It will be observed that when the motors are connected in series relation for operation by direct currents, the windings 14 are connected in a closed circuit, and that when they are connected in parallel relation for operation by alternating currents, the circuit of the windings 14 is open.

The circuits of the motors may be further adjusted by means of a controller 17 comprising a plurality of stationary contact fingers 18 to 26, inclusive, and conducting segments 27, 28 and 29 that may be moved into engagement therewith. The segment 27, when moved through the positions indicated by the broken lines a, b, c and d, serves to connect the motors between a trolley conductor 30 and a track rail 31 supplied with direct current energy from any suitable source, such as that shown at 32, and also to vary the amount of a resistance 33 included in circuit with the motors. When the conducting segments 28 and 29 are moved through the positions indicated by the broken lines e, f and g, a transformer 34, supplied with alternating currents from any suitable source, such as that shown at 36, is connected between a trolley conductor 35 and the track rail 31, and one terminal of the motor is connected to one or another of leads 37, 38 and 39 from the transformer 34, whereby the voltage applied to the motor circuits may be varied.

It will be readily understood from the foregoing description that when it is desired to operate by direct currents, the change-over switch 3 will first be moved to the position indicated by the broken line D—C and then the controller 17 will be moved to the position a, a circuit being thereby established from trolley conductor 30, through conducting segment 27, resistance 33, motor 1, conducting segment 4 and motor 2, to the track rail 31, the motors being then connected in series. The resistance 33 may then be removed gradually from the circuits of the motors by moving the conducting segment 27 through the succeeding positions. Upon returning the controller 17 to its "off" position, a high induced voltage in the circuits of the motors 1 and 2 is prevented because the auxiliary windings 14 are connected to form a secondary closed circuit which retards the rate of change of the magnetic flux. The arrangements of the circuits, when operating by alternating currents, will be readily understood from the foregoing description and an inspection of the drawing.

If desired, the circuit of the auxiliary field magnet windings may be governed by the controller 17 rather than by the change-over switch 3, as indicated in Fig. 2. In this modification, the segment 5 and the contact fingers 8 and 9 are omitted and the drum of the main controller is provided with a conducting segment 40 that engages contact fingers 41 and 42 for a period after the motors are disconnected from the direct current source of supply, the fingers 41 and 42 being connected to the terminals of the winding 14, as indicated.

In Fig. 3, auxiliary field magnet windings 43 and 44 of motors 45 and 46 are connected permanently in a closed circuit, a change-over switch 47 serving to adjust the circuit relations of the motors in such a manner that, upon disconnecting them from the direct current supply circuit, the currents induced in the windings 43 and 44 will traverse the closed circuit in the same direction, and so that, when operated by alternating currents, the induced currents in the windings 43 and 44 will traverse the closed circuit in opposite directions. The controller for connecting the motors to the proper source of energy and for varying the voltages applied thereto, is substantially the same as that shown in Fig. 1 and it is only necessary to trace the circuits through the change-over switch in order to understand how the circuits of the motors are adjusted in order to effect this result. When the motors are operated by direct currents, the contact segments 48 and 49 of the change-over switch engage the corresponding contact fingers and the circuit thus established includes the motor 45, the conducting segment 48, the motor 46 and the conducting segment 49. The induced electromotive forces in the windings 43 and 44 are then added and the currents traverse the closed circuit in the same direction. When the motors are operated by alternating currents, the fingers engage the contact segments 50 and 51 and the circuit includes the conducting segment 50, the motors 45 and 46 in parallel relation and conducting segment 51, it being observed that the current first traverses field magnet winding 52 of the motor 45 and then its armature 53, while it traverses the armature 54 of the motor 46 before traversing its field magnet winding 55, the direction in which the current traverses the motor 46 being the reverse of that in which it traverses the motor 2 of Fig. 1. The induced electro-motive forces in the auxiliary windings 43 and 44 will then oppose each other and the closed circuit therefore becomes ineffective as a secondary circuit when the motors are operated by alternating currents.

It will be understood from what has been shown and described that the field magnet polar projections of a single motor may be provided with auxiliary windings which may be closed-circuited upon disconnection of the motor from the direct current source of supply and may be open-circuited when operating by alternating currents, and that more than two motors may be employed, the circuits of the auxiliary field magnet windings of which may be closed only upon interruption of the direct current circuit or the auxiliary field magnet windings of which may be connected in pairs or groups in closed-circuit in a manner similar to that shown in Fig. 2.

It will also be understood that the motors may be arranged in other relations than in series for operation by direct currents and in parallel for operation by alternating currents, and that the arrangements of the circuits in other respects and the structure of the motor may be considerably varied from what has been shown and described in order to secure substantially the same results, and without materially affecting the mode of operation, and I desire that all such modifications shall be included within the scope of my invention.

The modification shown in Fig. 3 of the drawings is not specifically claimed herein, since it constitutes the subject-matter of a divisional application, Serial No. 417,367, filed Feb. 24, 1908.

I claim as my invention:

1. The combination with an electric motor that may be operated by either alternating or direct currents, of an auxiliary field magnet winding therefor that remains open-circuited when the motor is operated by alternating currents but which is closed-circuited on itself when the motor is operated by direct currents.

2. The combination with a source of direct currents, a source of alternating currents and an electric motor that is provided with an auxiliary field magnet winding, of means for connecting the motor with and disconnecting it from the said source, and means for closing the circuit of the auxiliary winding upon itself when the motor is disconnected from the source of direct currents.

3. The combination with an electric motor that may be operated by either alternating or direct currents, of an auxiliary field magnet winding the circuit of which is normally open and means for closing the circuit thereof upon interruption of the circuits of the motor after operation by direct currents.

4. The combination with a source of direct currents, a source of alternating currents and one or more electric motors that may be operated by either character of energy, of auxiliary field magnet windings therefor that serve as closed-circuit secondary windings upon interruption of the circuits of the motors after operation by direct currents but which are ineffective as secondary windings when operating by alternating currents.

5. The combination with one or more electric motors that are adapted to be operated by either alternating or direct currents, of auxiliary field magnet windings therefor that serve as secondary windings to retard changes in field magnetism when operating by direct currents but are ineffective as secondary windings when operating by alternating currents.

6. The combination with one or more electric motors that may be operated by either direct or alternating currents and auxiliary field magnet windings therefor, of means whereby the motor circuits may be arranged for operation in accordance with the character of energy that may be supplied thereto; whereby the auxiliary field magnet windings may be caused to serve as secondary windings to retard changes in field magnetism when operating by direct currents, and whereby they may be rendered ineffective as secondary windings when operating by alternating currents.

7. The combination with one or more electric motors that may be operated by either direct or alternating currents and auxiliary field magnet windings therefor, of means whereby the motors may be arranged in series relation when operating by direct currents and in parallel relation when operating by alternating currents; whereby the auxiliary field magnet windings may be caused to serve as secondary windings to retard changes in field magnetism when operating by direct currents, and whereby they may be rendered ineffective as secondary windings when operating by alternating currents.

In testimony whereof, I have hereunto subscribed my name this 2nd day of December, 1905.

BENJ. G. LAMME.

Witnesses:
ELIZABETH LIVINGSTONE,
BIRNEY HINES.